United States Patent [19]

Arabei et al.

[11] Patent Number: 5,036,170
[45] Date of Patent: Jul. 30, 1991

[54] METHOD FOR CLEANING FERROMAGNETIC CHIP FROM A LUBRICANT-COOLANT AND AN APPARATUS FOR CARRYING OUT THE METHOD

[76] Inventors: Boris G. Arabei, ulitsa Energeticheskaya, 8, korpus 3, kv. 44; Sergei B. Kostyrev, ulitsa Konenkova, 21a, kv. 123, both of Moscow; Alexandr S. Mints, mikroraion imeni Dzerzhinskogo, TSOVB, 2, kv. 13, Moskovskaya oblast; Lev A. Pronin, ulitsa Melnikova, 27, kv. 150, Moscow; Dmitry I. Ryzhonkov, ulitsa Novatorov, 40, korpus 12, kv. 10, Moscow; Sergei A. Sopochkin, ulitsa Junykh Lenintsev, 75, korpus 3, kv. 16, Moscow; Sergei A. Stepnov, Altufievskoe Shosse, 78, kv. 201, Moscow; Vladimir L. Esikman, ulitsa Krasnogo Mayaka, 1, korpus 1, kv. 48, Moscow; Andrei V. Vasiliev, ulitsa Grishina, 23, korpus 3, kv. 2, Moscow; ALexandr P. Kolgin, ulitsa Pestelya, 2, kv. 162, Moscow, all of U.S.S.R.

[21] Appl. No.: 323,388

[22] Filed: Mar. 14, 1989

[30] Foreign Application Priority Data

Mar. 15, 1988 [SU] U.S.S.R. .................. 4392275

Mar. 15, 1988 [SU] U.S.S.R. .................. 4392291

[51] Int. Cl.$^5$ ........................................... H05B 6/14
[52] U.S. Cl. .................... 219/10.41; 219/10.57; 219/10.75; 34/1; 209/227; 210/175
[58] Field of Search ............... 219/10.41, 10.43, 10.57, 219/10.75, 10.69, 10.55 R; 210/175, 186, 222, 223; 209/226, 227; 34/1, 4

[56] References Cited

U.S. PATENT DOCUMENTS

| | | | |
|---|---|---|---|
| 3,684,090 | 8/1972 | Kilbride | 209/227 |
| 4,116,839 | 9/1978 | Unkelbach et al. | 210/222 |
| 4,737,610 | 4/1988 | Kotsch et al. | 219/10.55 R |
| 4,755,288 | 7/1988 | Mitchell et al. | 210/222 |
| 4,865,747 | 9/1989 | Larson et al. | 210/222 |

OTHER PUBLICATIONS

"Sbor i pererabotka metallicheskoi struzhki", by A. V. Alekseenko, the Mashinostroenie Publishers, 1980, Moscow, pp. 31-33.

*Primary Examiner*—Philip H. Leung
*Attorney, Agent, or Firm*—Fleit, Jacobson, Cohn, Price, Holman & Stern

[57] ABSTRACT

In a method and apparatus for cleaning ferromagnetic chip from a lubricant-coolant the chip is heated, held at a preset temperature, and acted upon by a rotating electromagnetic field within a temperature range from 105° C. to 310° C.

10 Claims, 1 Drawing Sheet

METHOD FOR CLEANING FERROMAGNETIC CHIP FROM A LUBRICANT-COOLANT AND AN APPARATUS FOR CARRYING OUT THE METHOD

FIELD OF THE INVENTION

This invention relates to processing solid wastes, and more particularly to a method for cleaning ferromagnetic chip from a lubricant-coolant and an apparatus for carrying out the method.

The invention can find application in any branch of the machine-building industry where cleaning ferromagnetic chip from a lubricating-cooling liquid is essential.

BACKGROUND OF THE INVENTION

There are known methods for cleaning ferromagnetic chip from a lubricant-coolant by washing the chip in organic solvents, such as in benzine, alkaline washing solutions, or in a hot water under pressure (cf., A. V. Alekseenko "Sbor i pererabotka metallicheskoi struzhki", 1980, Moscow, the Mashinostroenie Publishers, pp. 31 and 32). One disadvantage of these prior art methods resides in high labour intensity and costs associated with consumption of expensive ingredients of the washing solution, as well as in the need to employ special facilities for neutralizing the used washing solution and treating the waste water. However, the capital expenditures and cost price of the end product are substantial, whereas the damage to the environment is not prevented.

There is also known a method for cleaning ferromagnetic chip from a lubricant-coolant (cf., A. V. Alekseenko "Sbor i pererabotka metallicheskoi struzhki", 1980, Moscow, the Mashinostroenie Publishers, pp. 31 to 33) in which the ferromagnetic chip is conveyed to a heating zone, the chip is heated, held at a preset temperature, and then the clean chip is removed.

The ferromagnetic chip is processed here a rotating drum-type furnace, heating of the chip being done by the products of combustion of kerosene to a temperature of 700°–900° C., and the chip is held at this temperature for a time period of between 5 and 6 minutes. Ingredients of the lubricant-coolant present in the chip burn out, after which the chip is discharged and conveyed for a subsequent treatment.

A disadvantage of this method is low efficiency of the process, and low cleaning quality of the processed chip, as it turns out to be fouled with charred products of combustion of the organic ingredients of the lubricant-coolant and contains a substantial amount of oxides (up to 10–12%). Another disadvantage is contamination of the environment with gaseous toxic products of combustion of the lubricant-coolant and kerosene used for heating the chip necessitating the use of special arrangements capable of absorbing such products but still low in efficiency.

There is further known an apparatus for cleaning ferromagnetic chip from a lubricant-coolant (cf., A. V. Alekseenko "Sbor i pererabotka metallicheskoi struzhki", 1980, Moscow, the Mashinostroenie Publishers, pp. 31 and 32). The apparatus includes a charging conveyer, a washing machine, and a discharge conveyer. In this apparatus the conveyer carrying the chip is passed through the washing chamber of the washing machine, where the chip is washed with hot water (90°–95° C.) under a pressure of 3–4 kgf/cm$^2$ (0.3–0.4 MPa).

Then the chip is delivered to the conveyer outside the chamber to be conveyed to a drying chamber. A disadvantage inherent in this apparatus is that subsequent to cleaning chip of any size about 2% of the initial quantity of the lubricant-coolant tends to remain at the chip surface. In addition, chip cleaning in this apparatus is inefficient and labour intensive, accompanied by environmental pollution with substantial amounts of water containing ingredients of the initial lubricant-coolant.

Another known apparatus for cleaning ferromagnetic chip from a lubricant-coolant (cf., A. V. Alekseenko "Sbor i pererabotka metallicheskoi struzhki", 1980, Moscow, the Machinostroenie Publishers, pp. 31 to 33) comprising a heating arrangement having a casting with a heater, a chip charging means, and a chip discharge means. The chip is charged into the heating arrangement in the form of a rotatable drum-type furnace 1.6 m in diameter and 8 m in length. The chip is heated here by a flow of gas for 5–6 minutes. Uses as the fuel is kerosene. The heating temperature is 700°–900° C. From the furnace the chip falls to the discharge means to be conveyed for further treatment. A major disadvantage of this prior art furnace is low efficiency caused by labour intensive charging and discharge procedures, and long chip cleaning process. In addition, the chip cleaned of grease in this apparatus shows high state of oxidation (10–12%), and has a film of charred products of combustion of organic compounds. Finally, substantial losses of water and oil present in the lubricant-coolant are in evidence in this apparatus. As much as 50 kg of water and 2.5 kg of oil are wasted per one ton of chip cleaned.

One more disadvantage is that the apparatus pollutes the environment with gaseous toxic products of combustion of organic compounds of the lubricant-coolant, as the facilities for absorbing these products are inefficient.

It is an object of the present invention to ensure a higher quality of cleaning ferromagnetic chip.

Another object is to prevent pollution of the environment with gaseous toxic products of combustion of ingredients of the lubricant-coolant.

One more object is to increase the efficiency of the chip cleaning process.

The objects of the invention are attained by that in a method for cleaning ferromagnetic chip from a lubricant-coolant in which the chip is conveyed to a heating zone, heated, held at a preset temperature, and the clean chip is discharged, according to the invention, in the course of heating and holding the chip is acted upon by a rotating electromagnetic field, the heating and holding being done within a temperature range from 105° C. to 310° C.

Preferably, the chip is heated and held at the preset temperature for a period of time 1.1 to 4.0 minutes.

Advisably, the chip is heated and held at the preset temperature in a flow of gas for a period of time from 0.7 to 3.1 minutes.

Carrying out the proposed method for cleaning ferromagnetic chip from a lubricant-coolant in a manner described heretofore makes it possible to avoid oxidation of the chip and ensure high chip cleaning quality thanks to the brief cleaning procedure at relatively low temperatures.

The objects of the invention are further attained by that in an apparatus for carrying out the method of cleaning ferromagnetic chip from a lubricant-coolant comprising a heating arrangement having a casing with a heater, a chip charging means positioned at the top of the casing, and a chip discharge means positioned at the bottom of the casing, according to the invention, the apparatus is provided with an induction coil enclosing the casing for generating therein a rotating electromagnetic field, a ferromagnetic core secured inside the casing coaxially therewith and with the induction coil, a heated splitter of the lubricant-coolant secured in the casing under the ferromagnetic core, a portion of the casing above the induction coil having the form of a header for evacuating vapours of the lubricant-coolant, and a chip metering device secured coaxially with the casing between the chip charging means and header.

Advisably, the apparatus is provided with an oil trap connected to the header, and a condenser connected to the oil trap.

Desirably, the casing has a sleeve of a nonmagnetic material disposed at the portion of the casing enclosed by the induction coil.

Advantageously, the casing is provided with tuyeres for feeding a gas positioned at the casing under the heated splitter.

The heretofore described embodiment of the proposed apparatus for cleaning ferromagnetic chip from a lubricant-coolant ensures high chip cleaning quality allowing a subsequent chip utilization, high efficiency of the chip cleaning process, and protection of the environment against toxic discharge.

BRIEF DESCRIPTION OF THE DRAWINGS

The invention will now be described in greater detail with reference to a preferred embodiment thereof taken in conjunction with the accompanying drawings, in which.

Figure 1:
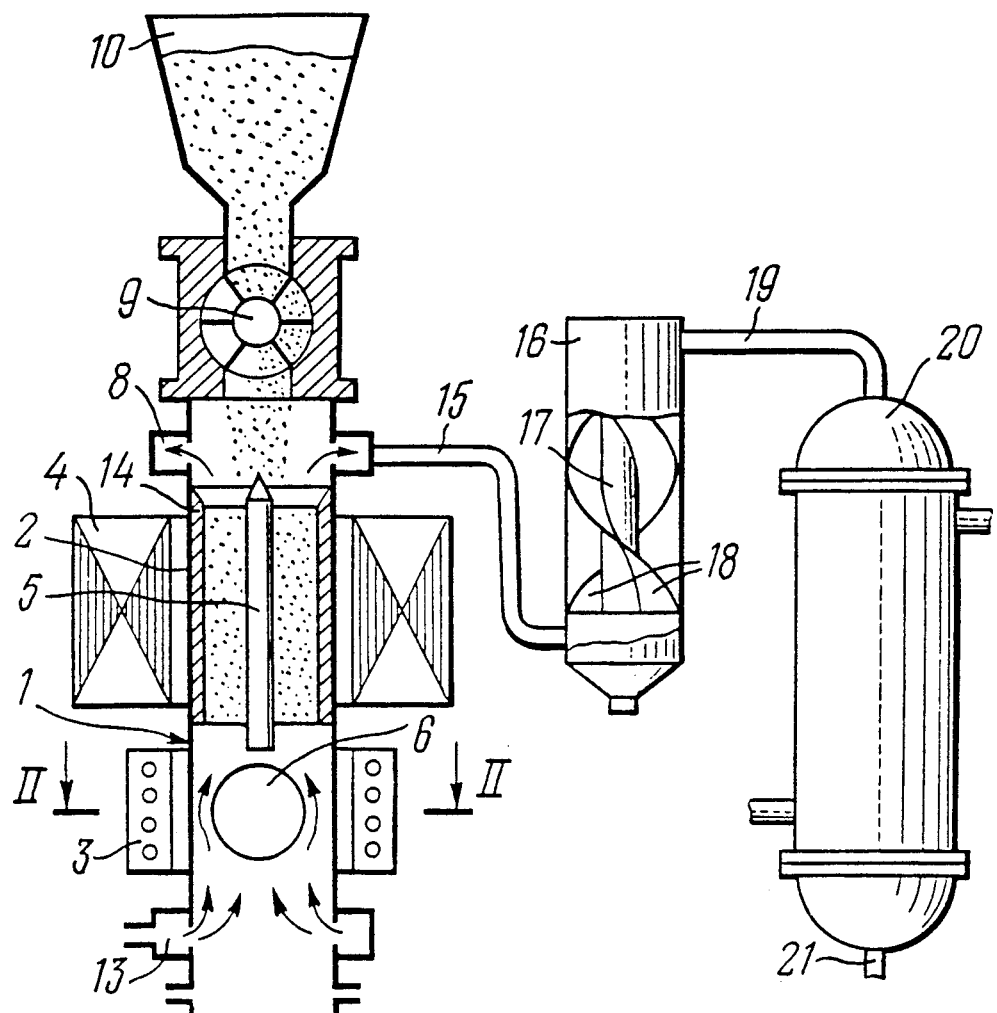
FIG. 1 is a general sectional view of an apparatus for cleaning ferromagnetic chip from a lubricant-coolant according to the invention.

A method for cleaning ferromagnetic chip from a lubricant-coolant resides in that the chip is conveyed to a heating zone, heated within a range of temperatures from 105° C. to 310° C., and held at this temperature for 1.1 to 4.0 minutes. In the course of heating and holding the chip is acted upon by a rotating electromagnetic field. The action of the rotating electromagnetic field on the mass of ferromagnetic chip results in that the alternating magnetic force causes rotation of the chip in a suspended state. During rotation the chip mass is vigorously stirred for the chip particles to collide therebetween whereby the process of removing liquid drops and vapours of the lubricant-coolant is intensified both by virtue of mechanical action and facilitated gas permeability of the chip bed. As a result, the time necessary for cleaning the chip at a temperature substantially lower than in the known methods is reduced.

Carrying out the cleaning process at a temperature range from 105° C. to 310° C. ensures effective removal of the components of the lubricant-coolant, since water, being part of this liquid, boils to remove some of oil drops from the chip surface mechanically, whereas the organic ingredients of the cooling-lubricating liquid tend to volatilize. In this temperature range the oil is not inflamed, and consequently not oxidized or fouled with the products of combustion of the lubricant-coolant, whereby no toxic gaseous combustion products are released outside. The vapours of the coolant-lubricant can be trapped in a simple and efficient manner by condensation, which again prevents evironmental pollution.

The proposed method for cleaning ferromagnetic chip from a lubricant-coolant can be carried out in a flow of gas with the chip being heated and held in a temperature range from 105° C. to 310° C. for 0.7 to 4.0 minutes.

Carrying out the cleaning process in a flow of gas (such as air) improves conditions for vaporization of the lubricant-coolant from the surface of the chip to result in a shorter cleaning time and, accordingly, a higher efficiency of the process, or alternatively, in a reduction of the temperature within said temperature range which allows to extend the service life of the thermal equipment.

Advantages of the proposed method over the prior art methods will become more fully apparent from examples that follow hereinbelow.

EXAMPLE 1 (the known method)

Pig iron chip containing 5 mass per cent of the lubricant-coolant is charged to a heating device, heated, and held until the lubricant-coolant completely burns out, after which the chip is removed. As the lubricant-coolant burns out, the composition of the effluent gas is determined chromatographically. CO and $SO_2$ is present in the effluent gas. Then the quantity of oxygen in the chip cleaned of the lubricant-coolant is measured.

EXAMPLES 2-9 (the proposed method)

Pig iron chip containing 5 mass per cent of the lubricant-coolant is charged to an apparatus for cleaning ferromagnetic chip from this lubricating-cooling liquid, a rotating electromagnetic field is generated in the apparatus, the chip is held in the apparatus to complete evacuation of the lubricanting-cooling liquid, the induction coil is then deenergized, and the cleaned chip is removed. The effluent gases are passed through an oil trap and through a condenser, after which composition of the gases is analyzed at the outlet. Temperature and duration of the process are registered. The process can be carried out both in a flow of air pumped through the cleaning apparatus and therewithout. Characteristics of the cleaning process and results are represented in the Table below.

| Process characteristics | Known method | | Proposed method | | | | | | |
|---|---|---|---|---|---|---|---|---|---|
| | 1 | 2 | 3 | 4 | 5 | 6 | 7 | 8 | 9 |
| Temperature in the housing, °C. | 900 | 80 | 105 | 200 | 310 | 400 | 105 | 200 | 310 |

-continued

| Process characteristics | Known method 1 | 2 | Proposed method 3 | 4 | 5 | 6 | 7 | 8 | 9 |
|---|---|---|---|---|---|---|---|---|---|
| Cleaning time, min. | 6.0 | 10.5 | 4.0 | 3.2 | 1.1 | 0.5 | — | — | — |
| Time of cleaning in a gas flow, min. | — | — | — | — | — | — | 3.1 | 2.2 | 0.7 |
| Toxic ingredients in the effluent gases | CO SO$_2$ | — | — | — | — | CO SO$_2$ | — | — | — |
| Content of oxygen in the cleaned chip, % | 10.5 | 1.10 | 1.23 | 1.35 | 1.6 | 3.8 | 1.2 | 1.28 | 1.47 |

It follows from the Table that processing the chip according to the proposed method reduces the time of cleaning by a factor of 1.5-6, and in the flow of air by a factor of 2-8.5 (Examples 7, 8, 9) accompanied by a substantial reduction in the temperature of the process. The efficiency of the process, normally reversely proportional to the duration of the process, grows, respectively, by 1.5-6 and 2-8.5 times as compared with the known method. A higher cleaning quality is attained, as the chip is free of the products of combustion of the lubricant-coolant, whereas the state of oxidation of the chip is reduced by a factor of 3.4-8.7. At a temperature below 105° C. the time necessary for carrying out the cleaning process markedly increases accompanied by a drop in efficiency, which is accounted for by the fact that water present in the lubricant-coolant fails to boil and entrain oil drops with vapours (Example 2). A temperature exceeding 310° C. causes inflammation of the oil to result in the presence of toxic components in the effluent gases and excessive oxidation of the chip (Example 6). The proposed method poses no threat to the environment, as after passing oil traps and condenser the effluent gases are free of toxic substances (Examples 3, 4, 5, 7, 8, 9).

Figure 2:
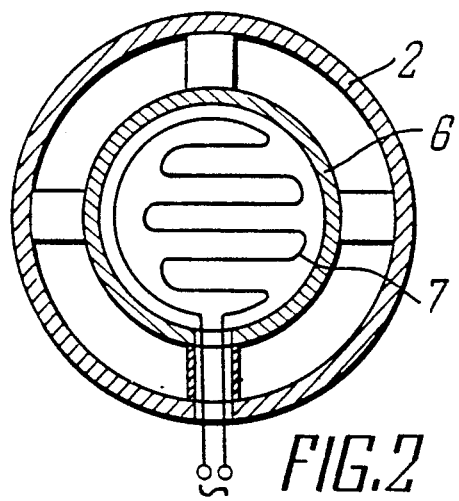
FIG. 2 is a section taken along the line II—II in FIG. 1.

Referring now to FIG. 1, and apparatus for cleaning ferromagnetic chip from a lubricant-coolant comprises a heating arrangement 1 having a casing 2 and a heater 3. The casing 2 is enclosed by an induction coil 4 for providing therein a rotating electromagnetic field. Positioned coaxially with the induction coil inside the casing is a ferromagnetic core 5, whereas arranged under the core 5 is a heated splitter 6. The heated splitter 6 (FIG. 2) has a hollow spherical or elliptical shape with the interior thereof accommodating a heating element 7 electrically connected to a current source (not shown). A portion of the casing 2 (FIG. 1) overlying the induction coil 4 has the form of an annular header 8 for evacuating vapours of the lubricant-coolant. Positioned over the header 8 coaxially with the casing 2 are a metering device 9 and a chip charging means 10, whereas the bottom part of the casing 2 accommodates a chip discharge means 11 with a screw conveyer 12. The casing 2 is provided with two tuyeres 13 for feeding a gas secured under the heated splitter 6. In addition, the casing 2 has a replaceable sleeve 14 of a nonmagnetic wear-resistant material. The header 8 is connected by way of a pipe 15 to an oil trap 16, this oil trap 16 being fashioned as a cylindrical chamber accommodating a hollow shaft 17 with two spiral blades 18 secured thereon. The oil trap 16 is connected by way of a pipe 19 to a water-cooled condeser 20 having a pipe 21 for evacuating the condensate.

The apparatus for cleaning ferromagnetic chip from a lubricant-coolant operates in the following manner.

The heater 3 and heated splitter 6 act to heat the working space of the casing 2 and header 8 of the heating arrangement 1.

After heating the working space of the casing 2 to a preset temperature the induction coil 4 is energized to generate a rotating electromagnetic field, after which the metering device 9 feeds a quantity of ferromagnetic chip fouled with the lubricant-coolant from the charging means 10 to the working space of the casing 2. The electromagnetic field causes the chip to rotate and be stirred whereby conditions for vaporization and removal of the lubricant-coolant are greatly improved.

The ferromagnetic core 5 balances and enhances the strength of the electromagnetic field in the working space of the casing 2, which promotes a more uniform distribution of the chip across the casing. Upon termination of the cleaning process the induction coil 4 is deenergized, and the clean chip falls through a clearance between the casing 2 and heated splitter 6 to the discharge means 11 wherefrom it is conveyed by the screw conveyer 12 for further treatment. Drops of the lubricant-coolant trickling from the metering device 9 fall onto the heated splitter 6 to evaporate.

In addition, a gas is fed through the tuyeres 13 to the working space of the casing. The gas flows through the clearance between the splitter 6 and casing 2 to heat and improve vaporization of the lubricant-coolant.

The apparatus can operate with deenergized heater 3. In this case a hot gas is conveyed through the tuyeres 13 whereby it is possible to utilize the heat of a waste gas.

Vapours formed in the course of cleaning are continuously sucked off by a fan (not shown) to be conveyed via the header 8 and along the pipe 15 to the oil trap 16, the vapours of the lubricant-coolant tending to settle on the spiral blades 18 of the oil trap 16. Water vapours flow along the pipe 19 to the condenser 20 where they are condensed. The condensed water is evacuated from the condenser 20 through the pipe 21.

The induction coil 4 generates a rotating electromagnetic field in the working space of the casing 2. This field retains the chip for a time necessary for chip cleaning. The chip is swirled and agitated to improve conditions for vaporization and evacuation of the lubricant-coolant and result in a higher efficiency of the chip cleaning apparatus and improved chip degreasing. The ferromagnetic core 5 acts to balance and increase the strength of the magnetic field which affords an increase in the quantity of the chip being charged into the apparatus for cleaning and makes operation of the apparatus more efficient. The heated splitter 6 is intended to facilitate evaporation of the lubricant-coolant dripping down from the metering means 9. Drops of the lubricant-coolant fall onto the splitter 6 to be evaporated, the vapours being then entrained by a gas flow to be carried to the header 8. In the absence of the splitter 6 the lubricant-coolant would tend to drip from the metering device 9 to the discharge means 11 containing the clean chip. In consequence, the splitter 6 performs one more function, viz., it splits the flow of the ascending gas. The header 8 serves to evacuate the vapours of the lubricant-coolant, and is necessary both for improving the chip cleaning quality and facilitating operability of the apparatus in general.

In addition, the proposed apparatus ensures utilization of the ingredients of the lubricant-coolant. With this aim in view the apparatus is provided with an oil trap 16 and a vapour condenser 20. The metering device 9 automatically feeds the chip to the working interior of the casing 2 in equal quantities after equal time intervals which also results in a higher operation efficiency of the apparatus. The replaceable sleeve 14 protects the casing 2 of the apparatus against premature wear, and consequently makes it more reliable and durable.

In view of the aforedescribed, the method for cleaning ferromagnetic chip from a lubricant-coolant provides favourable conditions for fast evaporation of the lubricant-coolant, whereas high efficiency of the proposed apparatus for carrying out the method ensures automated loading and discharge of the chip, stirring the chip mass in the course of heating, holding the chip at a present temperature, and removing the lubricant-coolant to result in a higher operating efficiency. Chip quality remains high thanks to completely preventing it from oxidation, since the cleaning process is short and proceeds at relatively low temperatures negligeably higher than the oil boiling point. Utilization of the vaporized components of the lubricant-coolant and environmental protection are ensured by the use of the oil trap and condenser 20 which separate the water and oil.

What is claimed is:

1. A method of cleaning ferromagnetic chips from a lubricant-coolant, comprising:
   conveying the chips to a heating zone;
   in the heating zone, heating the chips to a temperature within a range of temperatures from 105° C. to 310° C. and simultaneously applying a rotating electromagnetic field thereto;
   and holding the chips within said range of temperatures under the action of said rotating electromagnetic field for a predetermined time period.

2. A method as defined in claim 1, in which said time period is in a range from 1.1 to 4.0 minutes.

3. A method as defined in claim 1, in which said time period is in a range from 0.7 to 3.1 minutes.

4. An apparatus for cleaning ferromagnetic chips from a lubricant-coolant comprising:
   a heating arrangement having a casing enclosing a working space and a heater for heating said space;
   a chip charging means positioned at the top of said casing for delivering chips to said space for cleaning;
   a discharge means positioned at the bottom of said casing for delivering chips from the casing;
   and induction coil enclosing a part of said casing for generating therein a rotating electromagnetic field;
   a ferromagnetic core secured inside said part of said casing coaxially with the casing and with said induction coil;
   a heated splitter for the lubricant-coolant secured in said casing under said ferromagnetic core;
   the casing further including a header for evacuating vapours of the lubricant-coolant, the header overlying said induction coil; and
   a chip metering means arranged coaxially with said casing between said chip charging means and said header for controlling the quantity of chips delivered to the working space from the charging means.

5. An apparatus as defined in claim 4, in which there are provided an oil trap connected to said header, and a condenser connected to said oil trap.

6. An apparatus as defined in claim 5, in which said casing has a sleeve of a nonmagnetic material accommodated in the part of said casing enclosed by said induction coil.

7. An apparatus as defined in claim 5, in which said casing is provided with tuyeres under said heated splitter for feeding gas into said space.

8. An apparatus as defined in claim 4, in which said casing has a sleeve of a nonmagnetic material accommodated in the part of said casing enclosed by said induction coil.

9. An apparatus as defined in claim 8, in which said casing is provided with tuyeres under said heated splitter for feeding gas into said space.

10. An apparatus as defined in claim 4, in which said casing is provided with tuyeres under said heated splitter for feeding gas into said space.

* * * * *